R. H. BARRETT & C. RAY.
COMBINATION FERTILIZER DISTRIBUTER AND COTTON SEED PLANTER.
APPLICATION FILED DEC. 23, 1912.
1,075,621.  Patented Oct. 14, 1913.
2 SHEETS—SHEET 1.
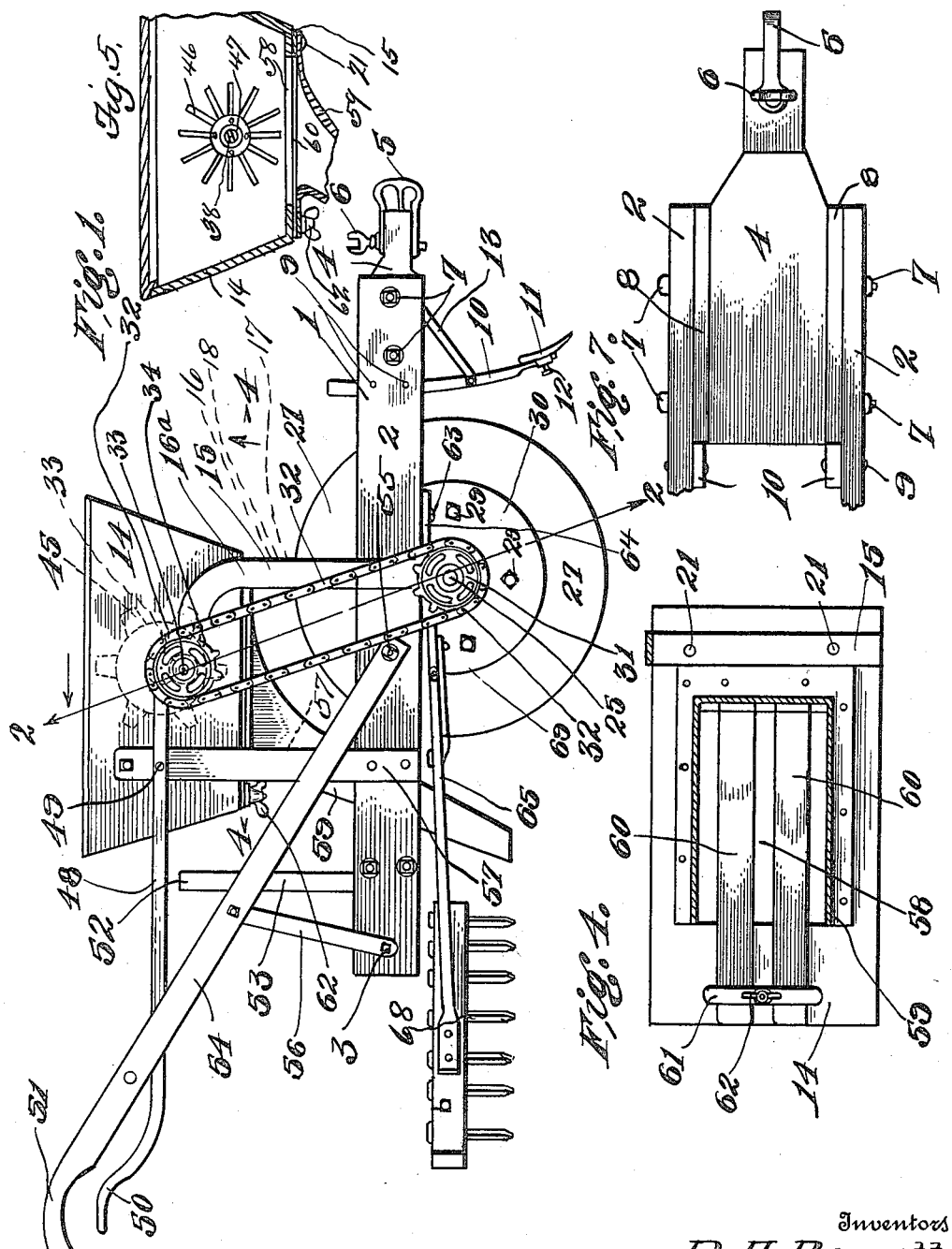
Witnesses
Rohe Meyer.
Francis G. Braswell
Inventors
R. H. Barrett
Claude Ray.
By D. Swift & Co
Attorneys

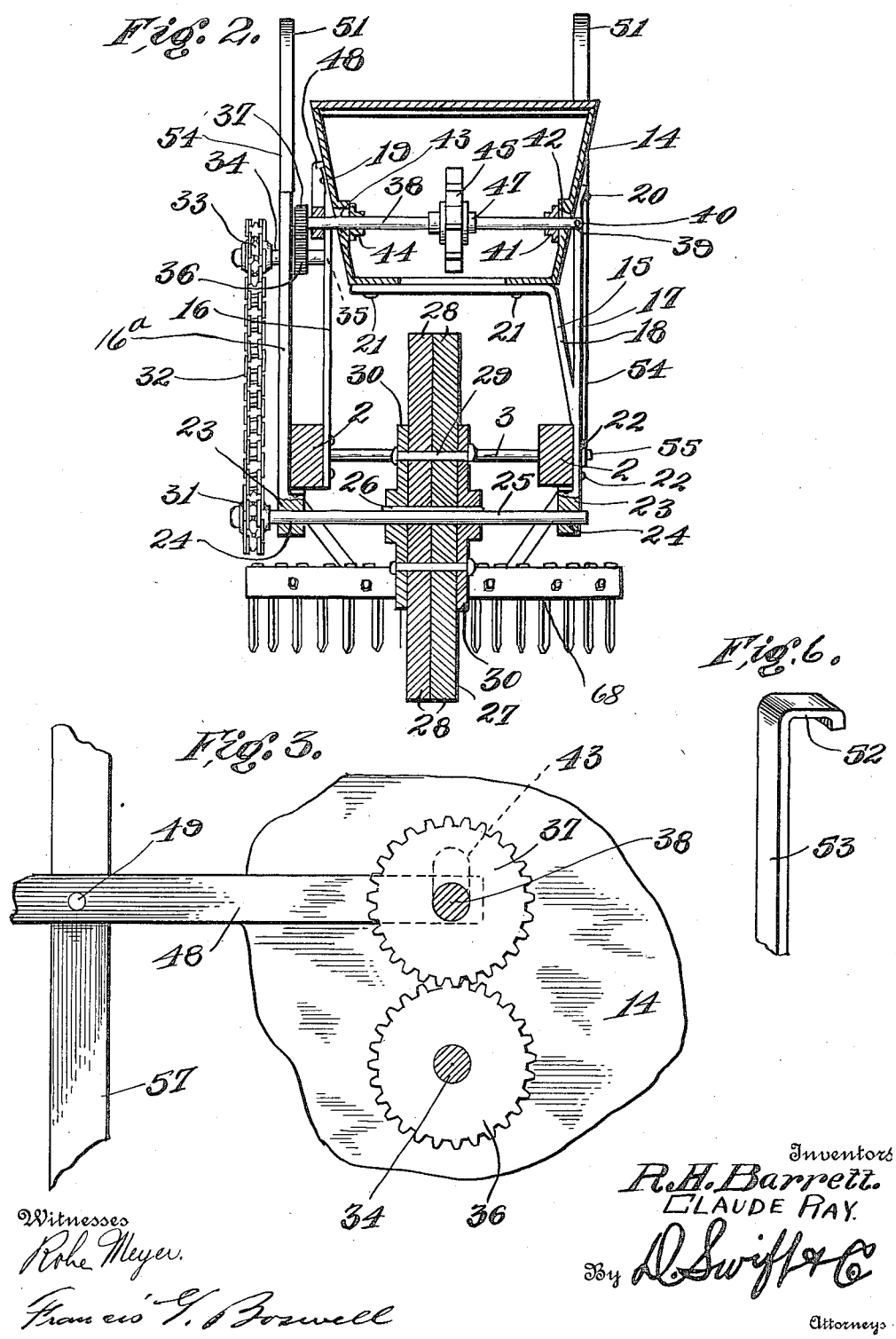

UNITED STATES PATENT OFFICE.

RICHMOND HAMU BARRETT AND CLAUDE RAY, OF NOXAPATER, MISSISSIPPI.

COMBINATION FERTILIZER-DISTRIBUTER AND COTTON-SEED PLANTER.

1,075,621. Specification of Letters Patent. Patented Oct. 14, 1913.

Application filed December 23, 1912. Serial No. 738,283.

*To all whom it may concern:*

Be it known that we, RICHMOND HAMU BARRETT and CLAUDE RAY, citizens of the United States, residing at Noxapater, in the county of Winston and State of Mississippi, have invented a new and useful Combination Fertilizer-Distributer and Cotton-Seed Planter; and we do hereby declare the following to be a full, clear, and exact description of the invention, such as will enable others skilled in the art to which it appertains to make and use the same.

This invention relates to a new and useful combination fertilizer distributer and cotton seed planter having a harrow attachment.

One of the features of the invention, is the provision of adjustable bars extending longitudinally of the opening in the bottom of the hopper, for regulating the distribution of the fertilizer or seed.

A further object of the invention is to provide an improved device of this design having desirable and practical features of construction, which are hereinafter set forth, shown in the drawings and claimed.

In the drawings:—Figure 1 is a view in side elevation showing the improved fertilizer distributer and seed planter constructed in accordance with the invention. Fig. 2 is a cross sectional view on 2—2 of Fig. 1. Fig. 3 is a detail view of a portion of the means for throwing the agitator in the hopper out of gear with the drive mechanism. Fig. 4 is a bottom plan view of the hopper, showing the bars to be adjusted for regulating the seed or fertilizer. Fig. 5 is a sectional view through the hopper showing the finger plate for agitating the seed in the hopper. Fig. 6 is a detail view of an arm for holding a lever in adjusted positions, which lever is designed for throwing the fertilizer agitator or finger plate out of gear with the driving mechanism. Fig. 7 is a detail plan view of the block 4 showing the clevis member 5.

Referring more specifically to the drawings 1 designates a frame, which comprises side bars 2, which are braced at their rear ends by the rod 3, while secured between their forward ends is a tongue block 4, to which the usual clevis member 5 is secured by the bolt 6. The tongue block is secured in place by the bolts 7, there being plates 8 between the block and the side bars or beams. Also bolted to the side bars or beams by the bolts 9 are the hoe standards 10 having the hoe plates 11 secured in position by the bolts 12. The hoe standards are braced by the bars 13.

Arranged above the frame 1 is a hopper 14, which is held in position relative to the frame 1 by means of a system of brace bars 15. This system of brace bars consist of the bars 16 and 16ª on one side of the machine, and the bars 17 and 18 on the opposite side of the machine. Upon referring to Fig. 1 it will be seen that these bars 16, 16ª, 17 and 18 are alined one behind the other, as indicated by the dotted lead lines to the respective numerals 16, 16ª, 18, and 17 in Fig. 1. However, the bar 18 forms an integral part of the bar 17, and bends under and is secured to the hopper 14, as at 21. The lower end of the bar 17 is secured to the outside face of one of the bars or beams 2, while the lower end of the bar 16 is secured to the inner face of one of the beams 2, whereas the bar 16ª is secured on the outside face of the beam 2, to which the bar 16 is secured, as shown clearly in Fig. 2. The upper end of the bar 17 is secured to the hopper as at 20, while the upper end of the bar 16 is secured at 19 to the opposite side of the hopper, while the bar 16ª at its upper end forms a bearing for the stub shaft 34, which also is mounted in a bearing 35 of the bar 16, as shown in Fig. 2. The connections of the bars 16ª, 16, 17, and 18 to the beams 2 are designated by the numeral 22. The lower portions of one of the bars 16 and the bars 17 terminate in extensions 23, in bearings 24 of which a drive shaft 25 is mounted. Keyed at 26 to the shaft 25 is a wheel 27, which may be constructed of any suitable material. This wheel 27 consists preferably of the wood disks 28, which are secured together by the bolts 29 and plates 30. On one end of the shaft 25 a sprocket 31 is keyed, and over which sprocket a sprocket chain 32 travels. This chain 32 in turn travels over the sprocket 33, which is mounted upon and revoluble with the stub shaft 34 mounted in bearings 35 of the bars 16. Mounted on and rotatable with the stub shaft is a gear 36, which meshes with the gear 37 mounted on and revoluble with the shaft 38. The end 39 of the shaft 38 is swivelly mounted in one side of the hopper, there being a pin 40 to prevent the shaft from moving longitudinally in one direction, while the collar 41 prevents longitudinal movement of the shaft in the opposite direction. The opening 42 of the hopper is elongated in the manner shown in Fig. 2, so that the end of the shaft 38 having the gear 37 may rise, while the opening 43 is correspondingly elongated, in order to permit the shaft 38 to rise. A collar 44 similar to the collar 41 is secured to the shaft 38. Either a fertilizer agitating plate 45, as shown in Figs. 1 and 2, or a finger plate 46 as shown in Fig. 5 for agitating the cotton seed may be secured at 47 on the shaft 38, whereby the fertilizer or the cotton seed or the like may be agitated.

The object for mounting the shaft 38 so it may be raised is to permit the gears 36 and 37 to be separated, so that the agitator may be thrown out of operation. To raise and lower one end of the shaft 38 a lever 48 pivoted at 49 is provided, in one end of which lever the shaft 38 is mounted. By holding the end 50 of the lever 48 substantially adjacent one of the handles 51, the gears 36 and 37 may be held in mesh, but by pushing downwardly upon the end 50 of said lever 48, the gear 37 will be thrown out of mesh with the gear 36. When the lever 48 is thrown downwardly, the same is placed in engagement under the hooked end 52 of the arm 53, so as to hold the gears 36 and 37 out of mesh. The handle bars 54 are secured at 55 to the beams or bars 2, and braced by the straps 56. The hopper is additionally braced relative to the frame 1 by the bars 57 one on each side. These bars 57 are arranged alined, one in the rear of the other, as shown by the dotted lead line to the extra numeral 57 in Fig. 1, and at the end of the hopper, opposite the end or corners where the bars 16ª, 16, 17, and 18 are arranged.

The bottom of the hopper is provided with an opening 58, through which and the spout 59 the fertilizer or seed is adapted to pass. Extending longitudinally across the opening 58 is a pair of bars 60, which are held in adjusted positions by the clamp bar 61, the same being held in place by the thumb screw 62. By adjusting the bars 60, the distribution of the fertilizer or seed may be regulated. Secured to the beams 2 as at 63 are the plates 64, to which the spring arms 65 are hinged. Said spring arms are provided with a harrow device 68, for harrowing the soil.

From the foregoing it will be noted that there has been devised an exceptionally simple, efficient and desirable combination fertilizer distributer and seed planter, and one which has been found practical.

The invention having been set forth, what is claimed as new and useful is:—

1. In a fertilizer distributer and planter, a lower frame, said frame including longitudinal side beams, a hopper spaced above said frame, a system of bracing bars between the frame and the hopper, comprising a forward set of bars and the rear set of bars, each connecting the longitudinal beams and the hopper, one of the bars of the forward set including an additional bar integral therewith, bent under and secured to the hopper, said hopper including an agitator, the lower ends of two of the forward brace bars having extensions, a drive shaft mounted in said extensions and including a drive wheel, and connections between said drive shaft and the agitator.

2. In a fertilizer distributer and planter, a lower frame, said frame including longitudinal side beams, a hopper spaced above said frame, a system of bracing bars between the frame and the hopper, comprising a forward set of bars and the rear set of bars, each connecting the longitudinal beams and the hopper, one of the bars of the forward set including an additional bar integral therewith, bent under and secured to the hopper, said hopper including an agitator, the lower ends of two of the forward brace bars having extensions, a drive shaft mounted in said extensions and including a drive wheel, and connections between said drive shaft and the agitator, and means for throwing the agitator in and out of gear with said connections.

3. In a fertilizer distributer and planter, a lower frame, a hopper spaced above said frame, a system of brace bars connecting the hopper to the frame, a drive shaft mounted in bearings of two of the brace bars including a drive wheel, an agitator arranged in the hopper including a shaft pivoted at one end and provided with a gear at the other end, which other end is free to rise and lower, a stub shaft journaled in bearing of two of the brace bars, a sprocket on said stub shaft having connections with said drive shaft, a gear on said stub shaft, with which the gear of the agitator shaft meshes, and a lever pivoted to the hopper and connected to the free end of the agitator shaft, said lever adapted to be manually actuated to hold the two gears in and out of mesh.

In testimony whereof we have signed our names to this specification in the presence of two subscribing witnesses.

RICHMOND HAMU BARRETT.
CLAUDE RAY.

Witnesses:
B. F. McBRAYER,
W. T. KEMP.